United States Patent
Diederich et al.

(10) Patent No.: US 9,645,897 B2
(45) Date of Patent: May 9, 2017

(54) USING DUPLICATED DATA TO ENHANCE DATA SECURITY IN RAID ENVIRONMENTS

(71) Applicant: International Business Machines Corporation, Armonk, NY (US)

(72) Inventors: Michael Diederich, Mainz (DE); Thorsten Muehge, Budenheim (DE); Erik Rueger, Ockenheim (DE); Rainer Wolafka, Hofheim-Langenhain (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 14/644,328

(22) Filed: Mar. 11, 2015

(65) Prior Publication Data

US 2016/0266984 A1    Sep. 15, 2016

(51) Int. Cl.
*G06F 11/00*  (2006.01)
*G06F 11/14*  (2006.01)
(Continued)

(52) U.S. Cl.
CPC .......... *G06F 11/1471* (2013.01); *G06F 3/065* (2013.01); *G06F 3/0619* (2013.01);
(Continued)

(58) Field of Classification Search
CPC ............. G06F 11/1076; G06F 11/1092; G06F 11/1096; G06F 11/1402; G06F 11/2056; G06F 11/2094
See application file for complete search history.

(56) References Cited

U.S. PATENT DOCUMENTS

| 7,543,178 B2 | 6/2009 | McNeill et al. |
| 8,234,444 B2 | 7/2012 | Bates et al. |

(Continued)

FOREIGN PATENT DOCUMENTS

| CN | 102012847 B | 5/2013 |
| JP | 2012252532 A | 12/2012 |
| WO | 2009112332 A2 | 9/2009 |

OTHER PUBLICATIONS

Anonymous, "A method to recover from a RAID rebuild failure on the fly," An IP.com Prior Art Database Technical Disclosure, Jan. 2014, IP.com No. 000234059.

(Continued)

*Primary Examiner* — Charles Ehne
(74) *Attorney, Agent, or Firm* — Mark G. Edwards

(57) ABSTRACT

A method for processing a data object access request in a storage system having storage devices can include receiving an access request for accessing a first data object, the request being received by a controller that stores at least two consecutive data objects received by the storage system in different storage devices. The method may then include detecting that the first data object is corrupted, and determining, in response to the detecting, that a second data object has identical data as the first data object. Determining that the second data object has identical information as the first data object can include determining that a first metadata tag corresponding with the first data object and a second metadata tag corresponding with the second data object are identical. The second data object can then be provided in a response to the access request.

14 Claims, 8 Drawing Sheets

(51) Int. Cl.
*G06F 3/06* (2006.01)
*G06F 11/20* (2006.01)
*G06F 11/10* (2006.01)

(52) U.S. Cl.
CPC ........ *G06F 3/0689* (2013.01); *G06F 11/1076* (2013.01); *G06F 11/1402* (2013.01); *G06F 11/2056* (2013.01); *G06F 2201/84* (2013.01)

(56) References Cited

U.S. PATENT DOCUMENTS

| | | | |
|---|---|---|---|
| 8,417,989 B2 | 4/2013 | Kumar et al. | |
| 8,539,148 B1* | 9/2013 | Chen | G06F 3/0608 711/112 |
| 8,631,272 B2 | 1/2014 | Prabhakaran et al. | |
| 8,719,520 B1* | 5/2014 | Piszczek | G06F 11/1076 709/219 |
| 2002/0059539 A1* | 5/2002 | Anderson | G06F 11/1096 714/6.22 |
| 2005/0203973 A1* | 9/2005 | Yagawa | G06F 21/64 |
| 2008/0126842 A1* | 5/2008 | Jacobson | G06F 11/1662 714/6.12 |
| 2009/0112811 A1 | 4/2009 | Oliveira et al. | |
| 2009/0228648 A1 | 9/2009 | Wack | |
| 2014/0136887 A1 | 5/2014 | Murakami | |
| 2016/0246627 A1* | 8/2016 | Litke | G06F 9/45558 |

OTHER PUBLICATIONS

Suarez-Castanon et al., "Protecting Data Against Consecutive Disk Failures in RAID-5," 2009 Mexican International Conference on Computer Science (ENC), pp. 353-359, © 2009 IEEE, DOI: 10.1109/ENC.2009.56.

Unknown, "End-to-end checksum," IBM, IBM Knowledge Center, Nov. 2014, http://www-01.ibm.com/support/knowledgecenter/SSFKCN_3.5.0/com.ibm.cluster.gpfs.v3r5.gpfs200.doc/bl1adv_introe2echecksum.htm.

* cited by examiner

USING DUPLICATED DATA TO ENHANCE DATA SECURITY IN RAID ENVIRONMENTS

BACKGROUND

The present disclosure relates to storage systems, and more specifically, to using duplicate information stored on storage systems to aid data recovery.

Storage systems can combine hardware and software components in architectures designed to balance the data retention goals of reliability, availability, performance and capacity. Some storage systems use redundant arrays of independent disks (RAID) to balance the tradeoffs inherent to the maximization of these goals. These RAID architectures may include hardware and software modules which orchestrate the distribution and encoding of data across the arrays of disks, while presenting the array to higher level systems as a one or more logical storage units.

Disparate RAID architectures can be differentiated by their data distribution and encoding schemes. RAID-1, for example, mirrors data across multiple disks, while RAID levels 3-6 may encode data in stripes which can be distributed across a disk array.

SUMMARY

According to embodiments of the present disclosure, a method for processing a data object access request in a storage system can include receiving an access request for accessing a first data object, the request being received by a controller that stores at least two consecutive data objects received by the storage system in different storage devices. The method may then include detecting that the first data object is corrupted, and determining, in response to the detecting, that a second data object has identical data as the first data object. Determining that the second data object has identical information as the first data object can include determining that a first metadata tag corresponding with the first data object and a second metadata tag corresponding with the second data object are identical. The second data object can then be provided in a response to the access request.

Various embodiments are directed toward a computer-implemented method for reconstructing data stored on a failed storage device of a redundant array of independent disks (RAID) type storage system having two or more storage devices. The method first includes determining that a first data object stored on a first storage device requires reconstruction on a second storage device, wherein the first storage device is determined to inaccurately store at least one unit of data and the second storage device is designated to replace the first storage device. The method then includes determining whether a first metadata tag of the first data object is identical to a second metadata tag of a second data object stored on a different storage device than the first storage device, wherein the first and second metadata tags are generated by applying a hash function to the respective first and second data objects. The second data object can then be stored on the second storage device when the first metadata tag is identical to the second metadata tag. Alternatively, the first data object can be reconstructed using a RAID data reconstruction method and then stored on the second storage device when the first metadata tag is different from the second metadata tag.

Various embodiments are directed toward a computer-implemented method for reconstructing data stored on a failed storage device of a redundant array of independent disks (RAID) type storage system having two or more storage devices. The method includes first determining that a first data object stored on a first storage device requires reconstruction on a second storage device, wherein the first storage device is determined to inaccurately store at least one unit of data and the second storage device is designated to replace the first storage device. The method may then include determining whether at least one data object used to reconstruct the first data object is corrupted. The method may further include determining, in response to determining that at least one data object used to reconstruct the first data object is corrupted, whether there is a set of one or more data objects having identical data as the at least one data object stored on a different storage device than the first storage device. The first data object can them be reconstructed using the set of one or more data objects and storing the reconstructed first data object on the second storage device, when there is set of one or more data objects having identical data as the at least one data object.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
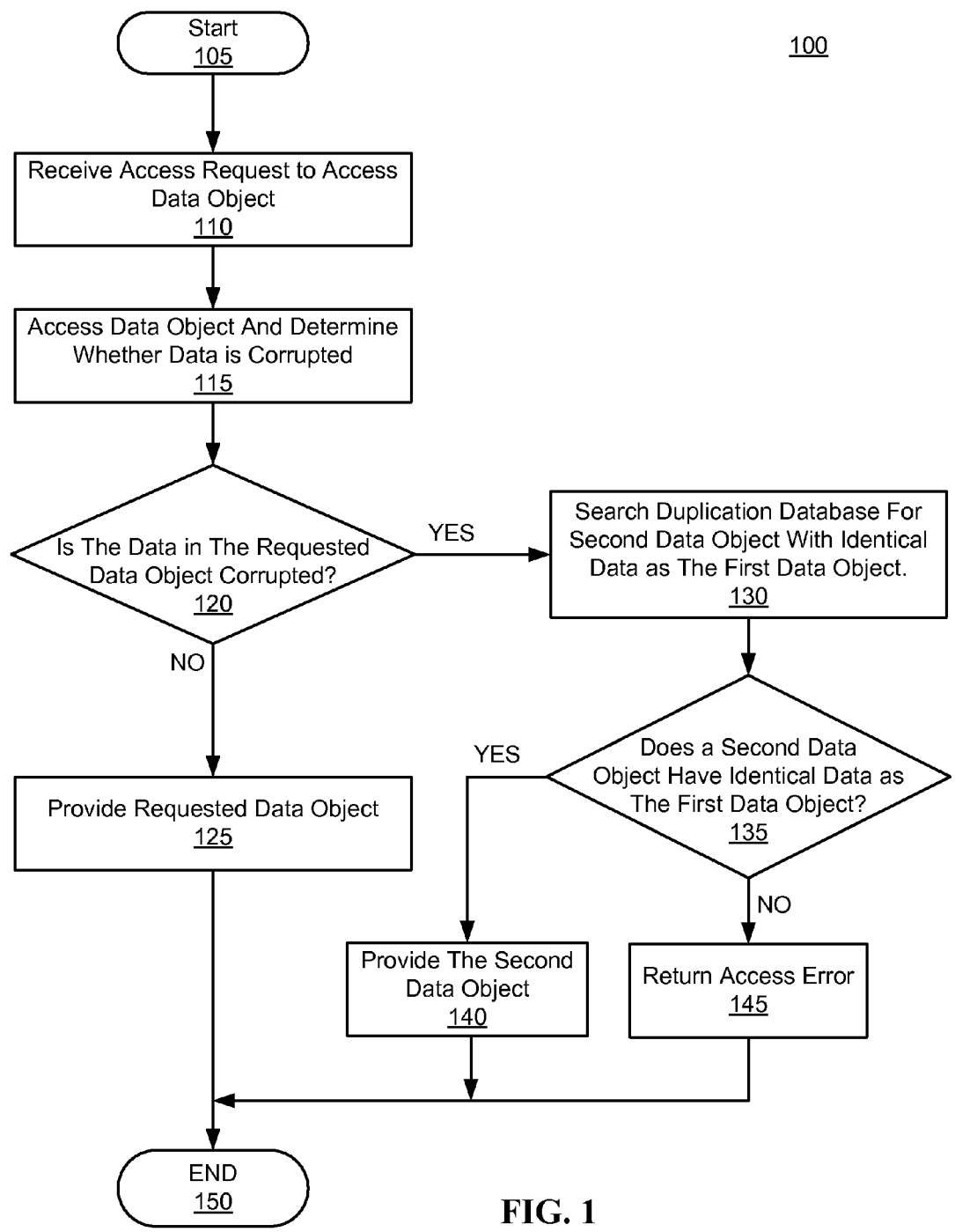
FIG. 1 depicts a flowchart of a method for processing a data object access request in a storage system, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to storage systems, more particular aspects relate to using duplicate information stored on storage systems to aid data recovery. While the present disclosure is not necessarily limited to such applications, various aspects of the disclosure may be appreciated through a discussion of various examples using this context.

Embodiments of the present disclosure are based on the recognition that data security plays a role in maximizing the data retention goals described herein. Data security my include making stored data reliably available for access, and ensuring that loss recovery and retention schemes have only limited impacts on storage capacity and system performance. Various embodiments are directed towards a method of improving data security in storage systems by using redundant data stored in data objects striped across multiple storage devices to recover from data corruption failures. According to various embodiments, when a request to access a stored data object is received by a storage system, the stored data object can be analyzed to determine whether data stored in the data object is corrupted. Upon determining that the stored data object is corrupted, a data duplication database containing a record of duplicated data objects stored on the system can be queried to determine whether there is another data object having the same data (e.g., duplicated data) as the requested data object stored in the storage system. The data object having duplicated data can be returned (e.g., instead of the corrupt requested data object), when found, in a response to the access request.

Embodiments of the present disclosure are directed towards a computer implemented method for reconstructing data stored on a failed storage device of a redundant array of independent disks (RAID) type storage system having two or more storage devices. The method includes first determining that a first data object stored on a first storage device requires reconstruction on a second storage device when the first storage device is determined to inaccurately store at least one unit of data. The method then includes determining whether a first metadata tag associated with the first data object is identical to a second metadata tag associated with a second data object stored on a different storage device than the first storage device. Each metadata tag can be generated by applying a hash function to the data stored in the associated data object. The method further includes storing the second data object on the second storage device when the first metadata tag is identical to the second metadata tag. Alternatively, the method includes reconstructing the first data object using a RAID data reconstruction method, and storing the reconstructed first data object on the second storage device when the first metadata tag is different from the second metadata tag.

Turning now to the Figures, FIG. 1 depicts a flowchart of a method 100 for processing a data object access request in a storage system having, according to various embodiments. The method 100 may be performed by a duplicated data engine (described infra) embedded in hardware and software in a host computing system, such as the computer system described herein in reference to FIG. 8. The method may begin at block 105 with the host computing system issuing, to the duplicated data engine, an access request to access a stored data object. In various embodiments a data object can be any unit of data, including, for example, a byte, block, or a sector. The access request can include a read operation, and an operation to determine attributes of the stored data object.

As the next step in the method 100, the duplicated data engine may receive the access request for accessing the data object, consistent with block 110. The access request may be received through messaging interfaces between the duplicated data engine and host processes, including an operating system, drivers, and other applications running on the host computing system. The request may also be received through hardware interfaces between the duplicated data engine and the host computing system. Consistent with certain embodiments, the request may include a data object identifier. A data object identifier may include a logical or physical address, and may, in whole or in part, uniquely identify a data object on the storage system.

The duplicated data engine, after receiving the access request, may continue the method by determining whether the requested data object is corrupted, consistent with block 115. A data object can be considered corrupted if the data read from the data object during an access attempt is inconsistent with the data that was stored in the data object (e.g., bits have flipped, or portions of the data are not accessible). According to some embodiments, the duplicated data engine may determine whether the requested data object is corrupted by attempting to read or query an attribute of the requested data object from the storage device. In the case of a read, the duplicated data engine can perform error detection on the read data. The error detection may include generating a metadata tag (described infra) for the read data object and comparing the generated metadata tag to the metadata tag associated with the requested data object's identifier. This requested data object's identifier and associated metadata tag may have been stored in a data duplication database (described infra) when the requested data object was written to the storage system. Differences between the two metadata tags could indicate data object corruption. According to some embodiments, the duplicated data engine can also determine whether the requested data object is corrupted by querying another process (e.g., an operating system) or subsystem (e.g., a storage subsystem) of the host computing device.

The duplicated data engine may proceed to method step 120 where it decides, based on the duplicated data engine's determination of whether the requested data object is corrupted, whether to provide the requested data object or search for a duplicate. The duplicated data engine may proceed to method step 125 and provide the requested data object in a response to the host computer system's access request when the duplicated data engine determines that the requested data object is not corrupted. Providing the requested data object to the host computer system may include passing the access request to appropriate subsystem (e.g., the storage subsystem), or reading and returning the requested data object to the host computing system.

The duplicated data engine may proceed from method step 120 to method step 130 when the duplicated data engine determines, at method step 115, that the requested data object is corrupted. At method step 130, the duplicated data engine may search the data duplication database to determine whether there is a second data object on the storage system that has data that is identical to the data stored in the requested data object. According to some embodiments, the data duplication database can include records associating a data object identifier with a metadata tag, where the metadata tag corresponds with a particular pattern of bits stored in the data object identified by the data object identifier.

Searching the data duplication database may involve two searches. A first search of the data duplication database may include looking for the requested data object's identifier. The duplicated data engine can then use a first metadata tag associated with the requested data object's identifier to search the data duplication database a second time for a record containing a second metadata tag that is identical to the first metadata tag. When a second metadata tag that is identical to the first metadata tag is found, the duplicated data engine may determine that a second data object (e.g., a duplicate data object) associated with the second metadata tag has identical data as the requested data object. Alternatively, when the a second metadata tag that is identical to the first metadata tag is not found, the duplicated data engine may determine that a data object having identical data as the requested data object cannot be located on the storage system.

According to some embodiments, when multiple data objects having duplicate data are found, the duplicated data engine may select a duplicate data object that best meets the data retention goals of the storage system. This may include selecting a data object located on a storage device that is under a lower workload than other storage devices. It may also include selecting a data object that can be accessed and transferred more efficiently than other data objects having duplicate data.

At method step 135, the duplicated data engine can determine whether to provide a duplicated data object to the host system, or return an access error. When a duplicate data object is found at method step 130, the duplicated data engine may return the duplicate to the host computing system, consistent with block 140. When a duplicate data object is not found, at method step 130, the duplicated data engine may return an access error (e.g., the access request may fail) to the host computing system, consistent with block 145. The method 100 ends at block 150.

Figure 2:
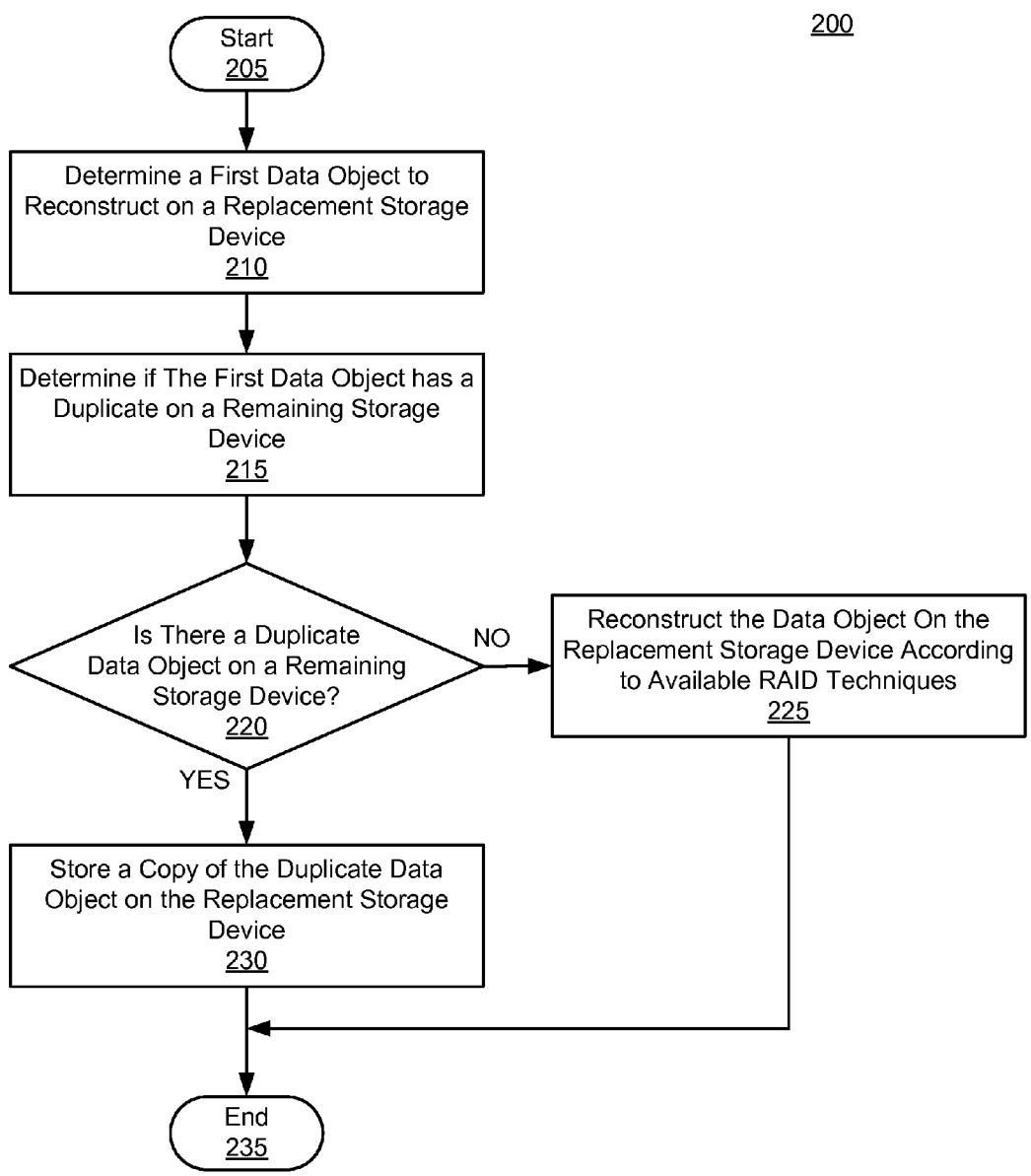
FIG. 2 depicts a flowchart of a computer-implemented method for using duplicated data to reconstruct data stored on a failed storage device of a redundant array of independent disks (RAID) type storage system having two or more storage devices, according to various embodiments.

FIG. 2 depicts a flowchart of a computer-implemented method 200 for using duplicated data to reconstruct data stored on a failed storage device of a redundant array of independent disks (RAID) type storage system having two or more storage devices, according to various embodiments. According to some embodiments, the method 200 may be performed by a duplicated data engine (described infra) embedded in hardware and/or software in a host computing system, such as the computer system described herein in reference to FIG. 8. The duplicated data engine may be configured to intercept data access messages sent from processes on the host computer system and destined for a storage controller in the storage system. In other embodiments, the duplicated data engine can be configured to intercept messages from the storage system and destined for a storage device.

The host computing system may start the method 200 at block 205 by initiating a storage device reconstruction process (e.g., a RAID rebuild). A storage device reconstruction may be initiated in response to determining that a first storage device is inaccurately storing at least one data object (e.g., where a storage device failed, or where one or more blocks of data are corrupted or inaccessible on a storage device). The reconstruction process may include replacing the first, damaged, storage device with a second storage device, and storing the data that was stored on the first storage device on the second storage device.

As part of the reconstruction process, the duplicated data engine may determine that a first data object stored on the first storage device requires reconstruction on the second storage device, consistent with block 210. In storage systems where data is striped across devices (e.g., where logically consecutive data objects in a data stream or file are stored on different storage devices), and where the storage system's architecture provides a method for reconstructing data objects (e.g., through the use of parity data objects) that are corrupted or lost due to the replacement of the first (e.g., failed) storage device, the duplicated data engine may determine that a data object should be reconstructed (e.g., in a memory) from data objects remaining on the system before it can be stored on the second storage device.

Before reconstructing the first data object, the duplicated data engine may search the data duplication database to determine whether a first metadata tag of the first data object is identical to a second metadata tag of a second data object stored on a different storage device than the first storage device (e.g., search for a duplicate data object, or data object having identical data as the first data object), consistent with block 215. The metadata tags, and the search process can be the same as described in reference to FIG. 1.

The duplicated data engine may proceed to method step 225 when a duplicate data object is not found, while the duplicated data engine may proceed to method step 230 when a duplicate data object is found, consistent with block 220. When a duplicate data object is not found (e.g., a second metadata tag identical to the first metadata tag was not found in the data duplication database), the duplicated data engine may reconstruct the first data object according to available reconstruction techniques (e.g., RAID level 3-6 drive reconstruction using parity blocks). Reconstructing first data object may include retrieving a set of data objects (e.g., parity data objects along with other data objects in the same stripe as the first data object) from a set of storage devices, different from the first storage device, performing logical operations on the retrieved set of data objects, and storing the resultant data object on the second storage device. In a RAID type storage system having three disks, for example, the first data object may be stored on a first storage device (e.g., failed disk), a second data object and a parity data object in the same stripe as the first data object may be on a second and a third storage device, respectively. Reconstructing the first data object may then include reading the second and third storage devices, and performing a logical operation on the retrieved data (e.g., the second data object and the parity data object may be exclusive-ORed together to reconstruct the second data object).

The duplicated data engine can support the system reconstruction process when a duplicated data object is found at method step 215. When a second data object having identical data as the first data object is found, the duplicated data engine can copy the second data object to a location on the second storage device designated for the first data object, consistent with block 230. As mentioned in the discussion of FIG. 1, when multiple data objects having duplicate data are found, the duplicated data engine may select a duplicate data object that best meets the data retention goals of the storage system. The computer-implemented method 200 may end at the method step shown in block 235.

Figure 3:
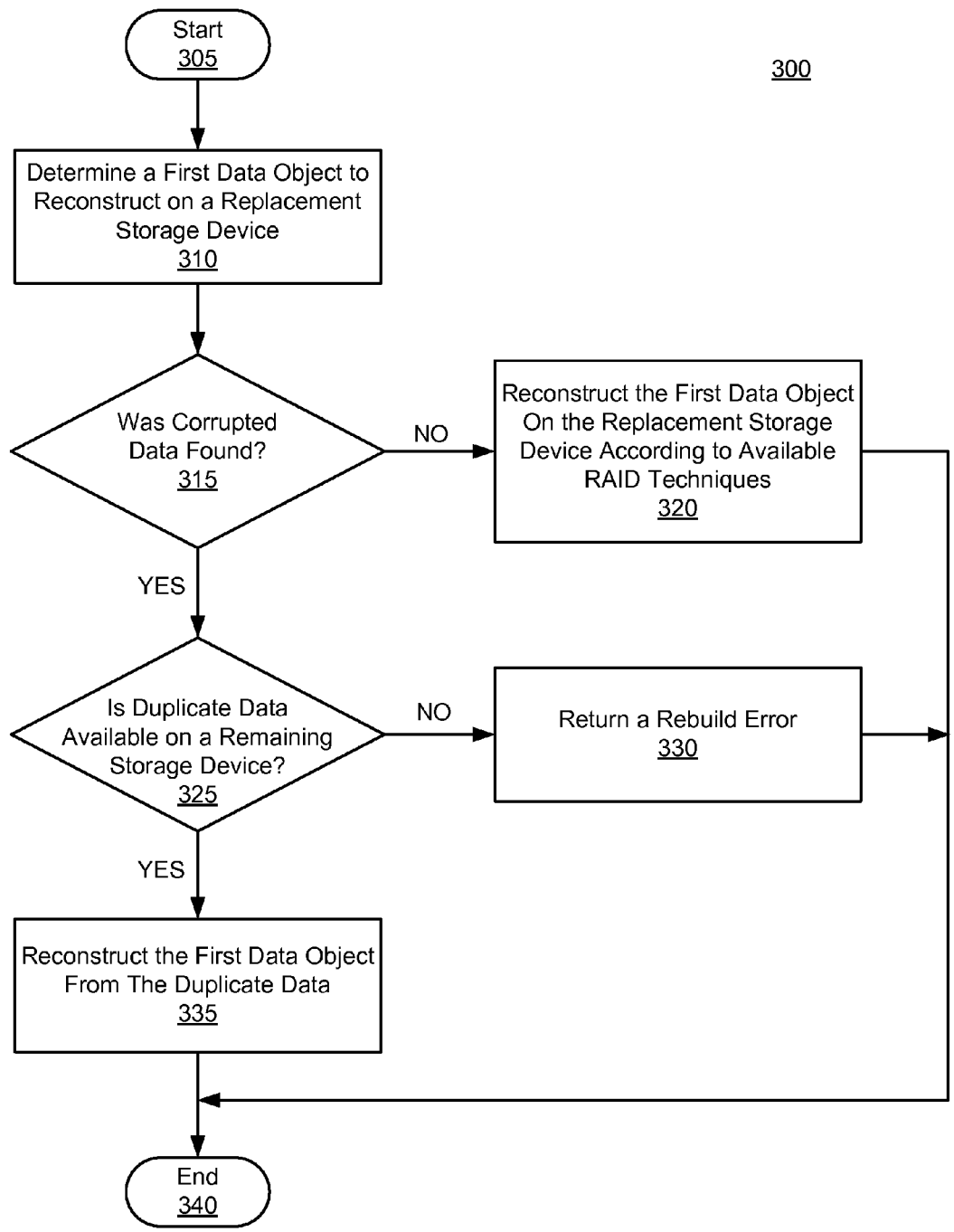
FIG. 3 depicts a flowchart of a computer-implemented method for using duplicated data to reconstruct corrupted data stored on a failed storage device of a redundant array of independent disks (RAID) type storage system having two or more storage devices, according to various embodiments.

FIG. 3 depicts a flowchart of a computer-implemented method 300 for using duplicated data to reconstruct corrupted data stored on a failed storage device of a redundant array of independent disks (RAID) type storage system having two or more storage devices, according to various embodiments. According to some embodiments, the method 300 may be performed by a duplicated data engine (described infra) embedded in hardware and/or software in a host computing system, such as the computer system described herein in reference to FIG. 8. The duplicated data engine may be configured to intercept data access messages sent from processes on the host computer system and destined for a storage controller in the storage system. In other embodiments, the duplicated data engine can be configured to intercept messages from the storage system and destined for a storage device.

The host computing system may start the method 300 at block 305 by initiating a storage device reconstruction process (e.g., a RAID rebuild). In some embodiments, the storage reconstruction process and the motive for initiating a storage device reconstruction can be the same as a discussed in association with method step 205 of FIG. 2.

As part of the reconstruction process, the duplicated data engine may determine that a first data object stored on the first storage device requires reconstruction on the second storage device, consistent with block 310. At the method step 315, the duplicated data engine may determine whether a set of one or more data objects to be used in the reconstruction of the first data object is corrupted. Data objects that may be used in the reconstruction of the first data object can include parity data objects, or a set of one or more data objects used by a RAID storage device reconstruction technique supported by the storage system (e.g., in a RAID storage system where data objects, including parity data objects, are striped across three storage devices, a parity data object and two remaining data objects within the same stripe as the first data object may be used in the reconstruction of the first data object). The duplicated data engine may proceed to method step 320 and reconstruct the first data object using available RAID techniques as described in association with block 225 of FIG. 2 when corrupted data is not found in a data object used in the reconstruction of the first data object, while the duplicated data engine may continue to method step 325 when corrupted data is found.

At method step 325, the duplicated data engine may determine whether there are duplicate data objects on a remaining storage device that may enable the reconstruction of the first data object. According to some embodiments, the duplicate data may include a data object having identical data as the first data object. In other embodiments, the duplicate data may include data objects having identical data as the set of one or more data objects that were found to be corrupted in at method step 315. The duplicated data objects may be identified by searching a data duplication database as described herein. When duplicate data objects are not found, the duplicated data engine may proceed to method 330 and return a rebuild error. Alternatively, when duplicate data objects are found, the duplicated data engine may proceed to method step 335 and rebuild the first data object using the duplicate data objects. In embodiments where the duplicate data is a data object having identical data as the first data object, the rebuild may include copying the duplicate data object to the replacement storage device in place of the first data object. In other embodiments, the duplicate data may be used to reconstruct the first data object using available RAID reconstruction techniques as described herein (e.g., in a RAID storage system where data objects, including parity data objects, are striped across three storage devices, the duplicate data could be used to replace a corrupted parity data object, or one or more data objects in the same stripe is the first data object, and the rebuild could proceed as described in association with method step 225 of the method 200 shown in FIG. 2). The reconstructed first data object can them be stored on the replacement storage device. The method 300 ends at method step 340.

Figure 4:
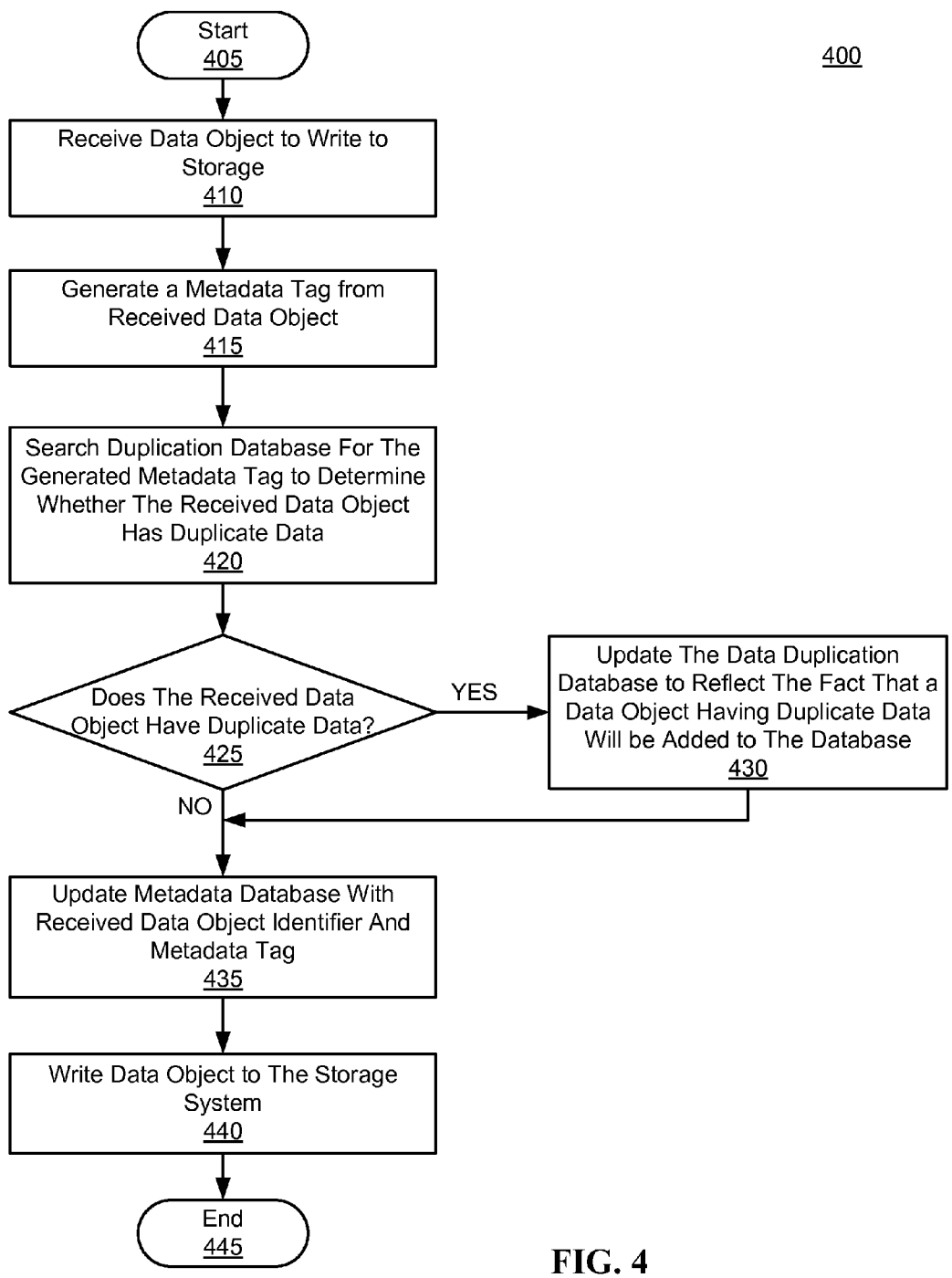
FIG. 4 depicts a flowchart of a method for generating a data duplication database as data is written to a storage system, according to various embodiments.

FIG. 4 depicts a flowchart of a method 400 for generating a data duplication database as data is written to a storage system, according to various embodiments. As described herein, the data duplication database can include records associating a data object identifier with a metadata tag, where the metadata tag corresponds with a particular pattern of bits stored in the data object identified by the data object identifier. The method 400 may be implemented in a duplicated data engine as described herein.

The method 400 may begin at the method step shown in block 405 by the initiation of a write operation by the host computing system. The duplicated data engine may then receive a request to write a data object to storage, consistent with block 410. The request can include the data object to write, along with a data object identifier identifying the data object on the storage system. As discussed herein, the data object can be any unit of storage, including, for example, bytes, blocks, or sectors of data. The data object identifier may be an address of the data object, including a logical or physical address.

The method continues to method step 415 where the duplicate data engine may generate a first metadata tag from the received data object, as shown in block 415. The duplicated data engine may generate the first metadata tag using a process that is able to map at least a portion of the sequence (e.g., pattern) of bits in the received data object to a tag that uniquely identifies the mapped sequence of bits (e.g., a hash function). Any hash function from known data deduplication methods may be used. In some embodiments, the first metadata tag may be a composition of multiple pieces of information, with at least one piece of information being related to at least a portion of the sequence of bits in the received data object.

The duplicated data engine may then proceed to method step 420 and search the data duplication database for a second metadata tag that is identical to the first metadata tag to determine if the received data object has duplicate data, consistent with block 420. Two metadata tags can be considered identical when corresponding portions of each metadata tag that uniquely identifies the sequence of bits in the data objects associated with each tag are the same.

When the received data object has duplicated data, the duplicated data engine may proceed to step 430, while the duplicate data engine may proceed to method step 435 when the received data object does not have duplicated data, consistent with block 425. At method step 430, the duplicated data engine may update the data duplication database to reflect the fact that a data object having duplicate data will be added to the database, consistent with block 430. Note this different from known data deduplication methods which may not store the duplicate data object. In some embodiments, updating the database may include associating, or creating links between a record allocated for the received data object and records for other data objects determined to have data identical to the received data object. According to particular embodiments, updating the database may also include reorganizing records, including modifying metadata tags, in the database to make searching more efficient. In some embodiments, method step 425 may be performed as a part of method step 430. The duplicated data engine may then proceed to method step 435.

When the received data object does not have a duplicated data, or after the duplicated data engine completes method step 430, the duplicated data engine may proceed to method step 435 and update the data duplication database with the received data object's identifier and the first metadata tag, as shown in block 435. According to some embodiments, updating the data duplication database may include allocating a record for the received data object's identifier and metadata tag, and storing the identifier and metadata tag in the allocated record. As discussed herein, updating the data duplication database may also include organizing records in the database to enable more efficient searching.

The duplicated data engine may write the received data object to the storage system at method step 440. In some embodiments, writing the received data object to the storage system may include passing the received data object to other components of the storage system to complete the writing process. The method 400 ends at method step 445.

Figure 5:
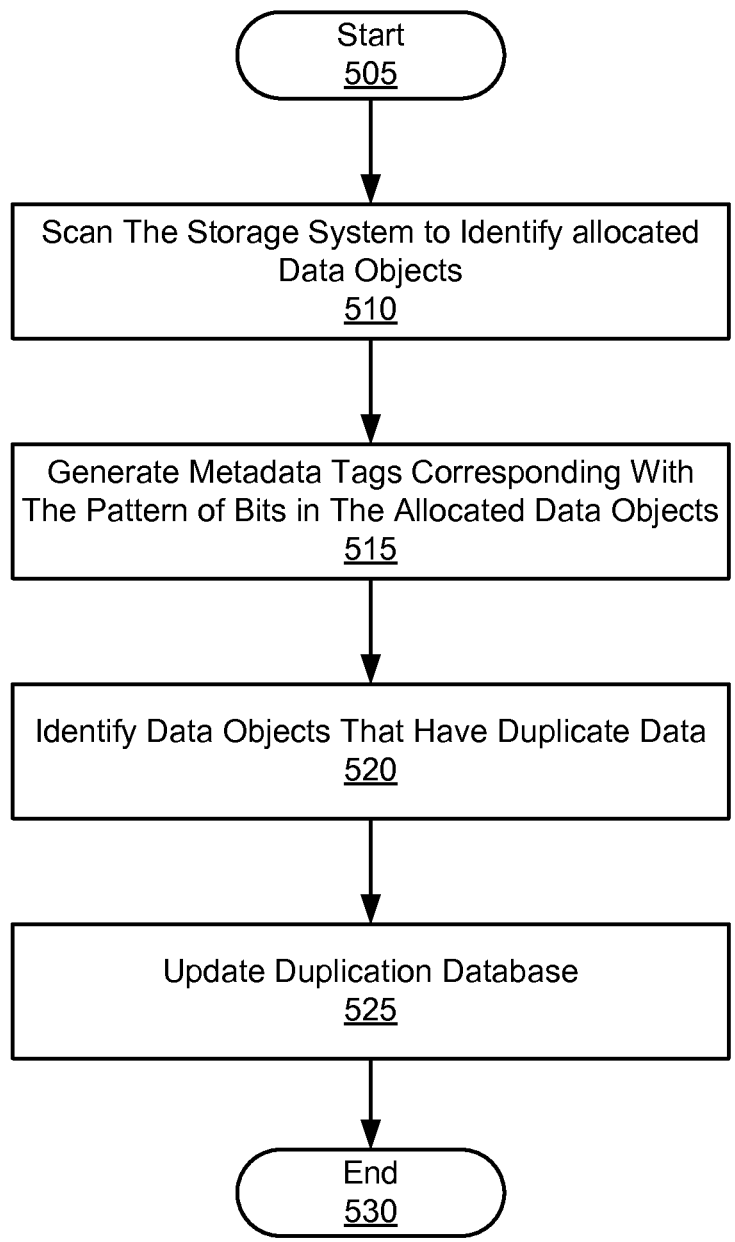
FIG. 5 depicts a flowchart of a method for generating a data duplication database for a storage system that is populated with data, according to various embodiments.

FIG. 5 depicts a flowchart of a method 500 for generating a data duplication database for a storage system that is populated with data, according to various embodiments. The method 500 may be implemented in a duplicated data engine as described herein. The method 500 begins at step 505, and may be initiated by a process running on the host computing system or by a duplicated data engine. The method 500 may be executed asynchronously (e.g., not in concert with a data object update or access operation) to refresh or update the data duplication database. The method 500 can be executed at times convenient for balancing the host computing system or storage system's resource utilization.

The duplicated data engine may scan the storage system to identify allocated storage objects (e.g., storage objects having data), consistent with block 510. Scanning the storage system may include searching all storage devices associated with the storage system (including, for example, local disks drives, solid state drives, and remote storage arrays) to identify allocated data objects. Scanning the storage system may also include querying a database or table having identifiers of allocated data objects. The allocated data objects may include data objects that were written to the storage system by processes running on, for example, the host computing system, and data objects that are generated by the storage system (e.g., data objects having parity information).

The duplicated data engine may continue the method 500 by generating metadata tags, as described in method step 415 of the method 400, for the allocated data objects identified in method step 510, as shown in block 515. In some embodiments, the duplicated data engine may compare the identified allocated data objects against a record of data objects that have been written to (e.g., updated or modified) after the last time the method 500 was executed and only generate metadata tags for those data objects that have been updated.

The duplicated data engine may continue the method 500 at method step 520 by identifying duplicated data objects in the storage system, consistent with block 520. Duplicate data objects can be identified using metadata tags and a data duplication database as described herein. Next, the duplicated data engine may update the data duplication database as described herein, consistent with block 525. The method 500 ends at the method step shown in block 530.

Note that in both method 400 and method 500, identified duplicate data objects remain on the storage system. The duplicates are preserved to serve a possible substitutes for data objects that may be corrupted. Consequently, the methods described herein are different from data deduplication techniques which may remove duplicated data objects from the storage system.

In some embodiments, the methods described herein may use data duplication information stored in the data duplication database to stripe duplicated data objects across several storage devices (e.g., write duplicated data objects to different storage devices when possible). Striping duplicated data objects may increase data security by ensuring that data objects having duplicated data are distributed across the several storage devices of a storage system. In some embodiments the striping may occur as data objects are written to storage system, as in method 300. In other embodiments, the striping may occur after data objects are written to the storage system, as in method 500, and may include relocating storage data objects to different storage devices.

Figure 6:
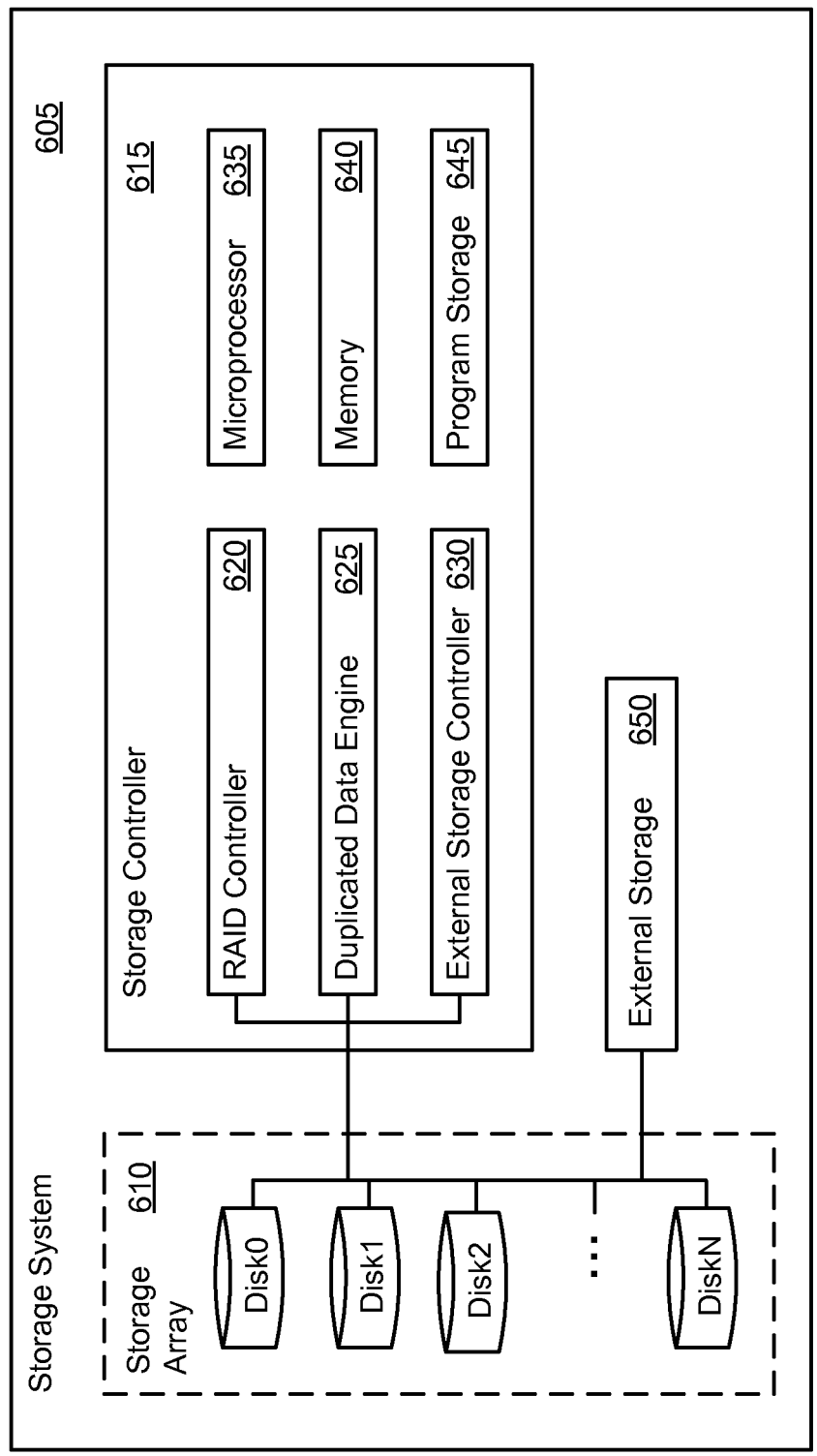
FIG. 6 shows a block diagram of a storage system employing a duplicated data engine, according to various embodiments.

FIG. 6 shows a block diagram of a storage system 605 having a duplicated data engine, according to various embodiments. The storage system may be a subsystem of a host computing system, such as the computing system shown in FIG. 8, and may service data access requests from the host computing system or other connected systems. In some embodiments, the storage system may control the encoding and distribution of data across storage devices, and may be responsible for optimizing the allocation of storages resources.

The storage system 605 may include a storage array 610, storage controller 615, and external storage resources 650. The storage array may include a set of storage devices (e.g., Disk0-DiskN). In some embodiments, the storage devices may be any storage medium configured to stored data objects as, for example, bits, bytes, blocks, or sectors. According to various embodiments, the storage array 610 may include a set of at least three storage devices (e.g., Disk0, Disk1, and Disk2). In other embodiments, the storage array 610 may include a set of only two storage devices. The storage devices may be configured to allow a data object to be striped across multiple storage devices.

The storage controller 615 may be a collection of software and/or hardware modules configured to execute the functions of the storage system. The storage controller 615 may include RAID controller 620, duplicated data engine 625, external storage controller 630, microprocessor 635, memory 640, and program storage 645. Microprocessor 635, memory 640 and program storage 645 may work together to executed software enabled functions of storage controller 615.

The RAID controller 620 may execute functions associated with the storage system's 605 particular RAID architecture, including striping data objects across storage devices, generating parity information, and device reconstruction. The RAID controller 620, however, does not perform mirroring operations (e.g., does not implement RAID 1). In some embodiments, RAID controller 620 may be an integral part of storage controller 615. In other embodiments, RAID controller 620 may be a separate module configured between storage array 610 and storage controller 615. In particular embodiments, RAID controller 620 may be implemented in a software module running on a host computing system.

Duplicated data engine 625 may include hardware and software components configured to execute the methods and systems disclosed herein. According to some embodiments, the duplicated data engine 625 may be a module within storage controller 610. In certain embodiments, the duplicated data engine 625 may be a module within another controller, such as RAID controller 620. In other embodiments, duplicated data engine 625 may be implemented as a software module running on the host computing system. The duplicated data engine 625 may receive data access requests, perform the methods described herein and respond to the requests, or forward the requests to other subsystems.

External storage controller 630 may execute functions associated with accessing data on storage devices external to the storage array 610 (e.g., external storage 650).

Figure 7:
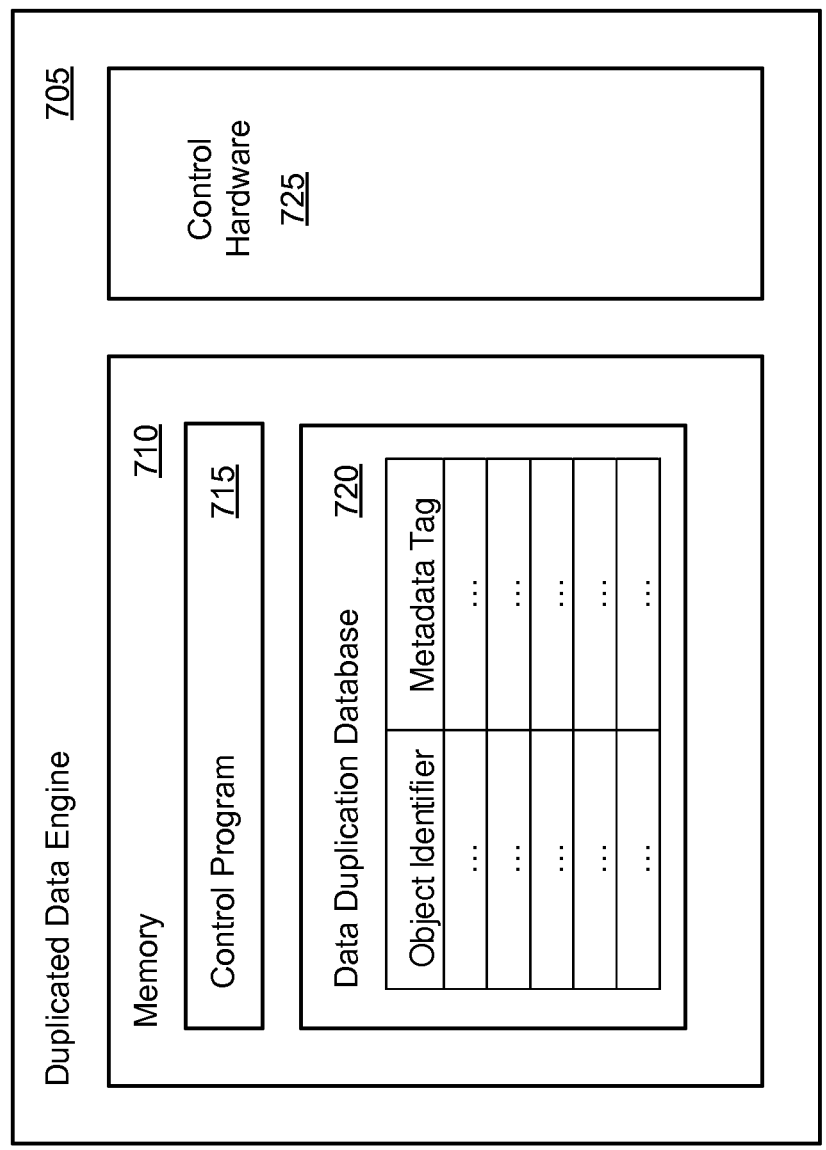
FIG. 7 shows a block diagram of a duplicated data engine, according to various embodiments.

FIG. 7 shows a block diagram of a duplicated data engine 705, according to various embodiments. The duplicated data engine 705 is an exemplary embodiment of the duplicated data engine described herein. As shown in FIG. 7, the duplicated data engine may include memory 710, and control hardware 725. In some embodiments, the duplicated data engine may be implemented in a software module without control hardware 725.

Memory 710 may include control program code 715 and data duplication database 720. Control program 715 may include computer executable code, configured to perform the methods described herein. Data duplication database 720 may include records having fields to store at least a data object identifier and an associated metadata tag. In some embodiments, the data duplication database may include additional fields, and the records and associated fields may be arranged in a manner to allow for efficient searching or utilization of the database. The data duplication database 720 may reside in temporary memory, in nonvolatile memory, or storage. In some embodiments, the data duplication database 720 may be distributed amongst the storage devices included in a storage system, such as storage system 605 shown in FIG. 6. Control hardware 725 may include a microprocessor (not shown) or other logic circuits capable of executing the control program 715, and capable of carrying out the methods described herein.

Figure 8:
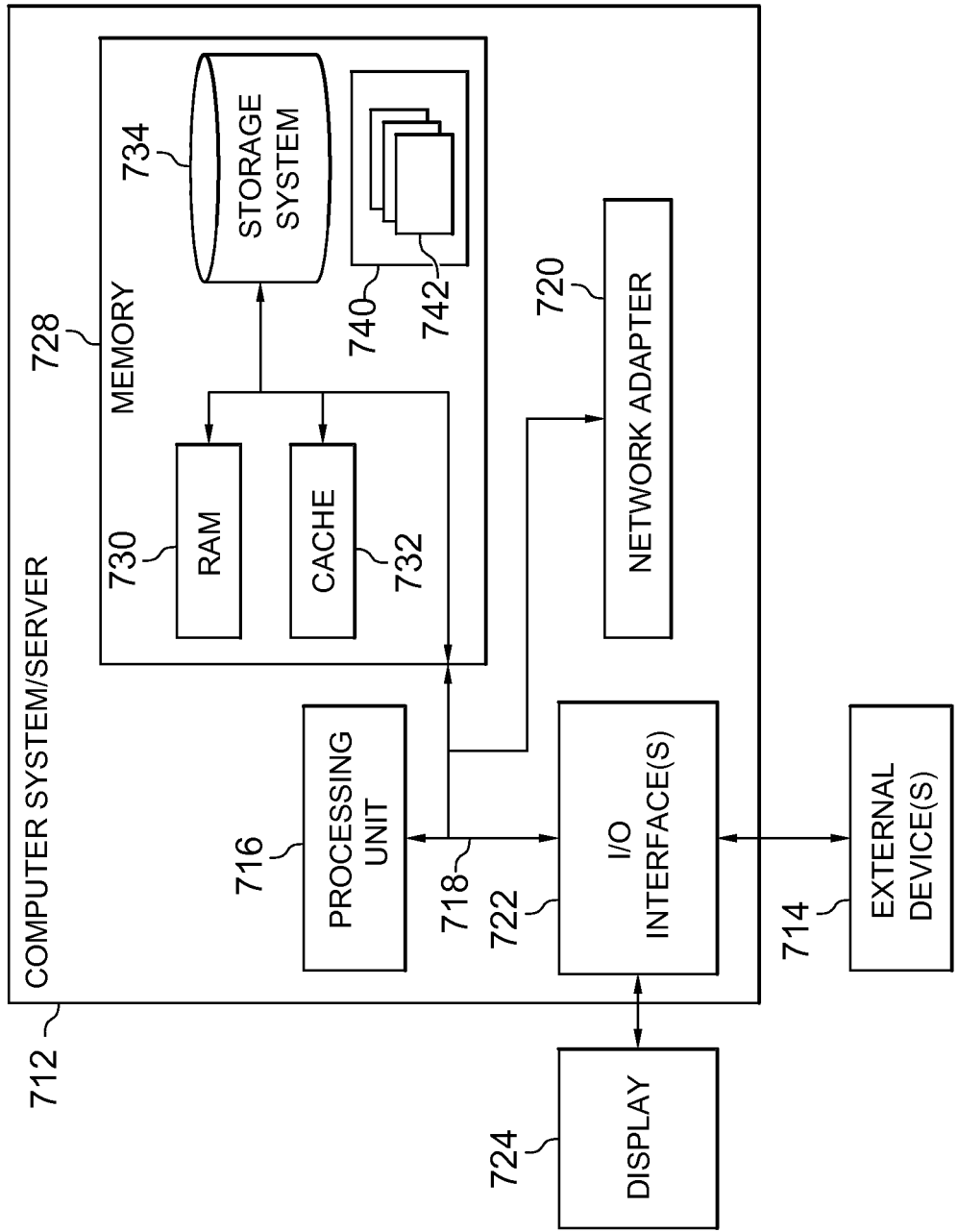
FIG. 8 shows a block diagram of a computer system capable of using a duplicated data engine, according to various embodiments.

FIG. 8 depicts a block diagram of a host computing system (hereinafter "computer/server system") 812 configured to implement the duplicated data engine and methods described herein. Computer system/server 812 is shown in the form of a general-purpose computing device. In various embodiments, the computer/server system 812 can be an automatic teller machine, a personal computer, a laptop computer, tablet computer, a cellular or other telephone of any kind, a building alarm system requiring a security code input, a point-of-sale terminal, a safe, an automobile, or any other device requiring a security code input. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. In some embodiments, the storage system can include an array of storage devices coupled to a storage controller (e.g., a RAID controller 520, or storage controller 515) which connects to bus 818. In particular embodiments, the storage controller may be coupled to bus 818 through I/O interface 822. The storage controller may include storage subsystems or engines, such as those discussed in association with FIGS. 1-7, configured to carry out the functions of embodiments disclosed herein. As will be further depicted and described below, memory 828 may include at least one program product having a set (e.g., at least one) of program modules that are also configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein. In some embodiments, for example, the program modules may include a duplicated data engine configured to perform the functions and methods described in association with FIGS. 1-5.

Computer system/server 812 may also communicate with one or more external devices 814 such as a keyboard, a pointing device, a display 824, digital camera, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc. In various embodiments, the computer system 812 can include one or more feedback indicators, such as the display 824, a speaker, or a haptic actuator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for processing a data object access request in a storage system, comprising:
   generating a data duplication database having metadata tags and associated data object identifiers to identify data objects stored on the storage system, wherein generating the data duplication database comprises,
      generating a first metadata tag uniquely corresponding with a particular pattern of bits stored in a first data object stored on the storage system,
      associating the first metadata tag with a first data object identifier identifying the first data object, and
      storing the first metadata tag and the first data object identifier in a first record of the data duplication database;
   receiving an access request for accessing a second data object, the request being received by a controller that stores at least two consecutive data objects received by the storage system on different storage devices;
   detecting that the second data object is corrupt;
   determining, in response to the detecting, that a third data object has identical data as the second data object, wherein the determining includes,
      determining that the data duplication database has both a second metadata tag uniquely corresponding with a particular patterns of bits stored in the second data object and a third metadata tag uniquely corresponding with a particular pattern of bits stored in the third data object, and
      determining that both the second metadata tag and the third metadata tag are identical; and
   providing the third data object in a response to the access request.

2. The method of claim 1, further comprising updating the data duplication database each time a new data object is updated or stored on the storage system, wherein updating the data duplication database comprises:
   generating a fourth metadata tag corresponding with a particular pattern of bits stored in the new data object,
   associating the fourth metadata tag with a second data object identifier identifying the new data object, and
   storing the fourth metadata tag and the second data object identifier in a second record of the data duplication database.

3. The method of claim 2, wherein the data duplication database is updated by scanning the storage system.

4. The method of claim 1, wherein the data duplication database includes records of data objects generated by the storage system.

5. The method of claim 1, further comprising:
   storing a fourth data object on a first storage device; and
   storing a fifth data object, having identical data as the fourth data object, on a second storage device.

6. A computer-implemented method for reconstructing data stored on a failed storage device of a redundant array of independent disks (RAID) type storage system having two or more storage devices, comprising:
   determining that a first data object stored on a first storage device requires reconstruction on a second storage device, wherein the first storage device is determined to inaccurately store at least one unit of data and the second storage device is designated to replace the first storage device;

retrieving both a first metadata tag corresponding to a particular pattern of bits stored in the first data object and a second metadata tag corresponding with a particular pattern of bits stored in a second data object from a data duplication database, wherein,
  the data duplication database comprises records, each record having both a data object identifier to identify each data object stored in the storage system and a metadata tag corresponding with a particular pattern of bits of stored in each data object,
  the second data object is stored on a different storage device than the first storage device, and
  the first metadata tag and the second metadata tag are generated by applying a hash function respectively to the first data object and the second data object;
determining whether the first metadata tag is identical to the second metadata tag;
storing the second data object on the second storage device when the first metadata tag is identical to the second metadata tag; and
reconstructing the first data object using a RAID data reconstruction method and storing the reconstructed first data object on the second storage device when the first metadata tag is different from the second metadata tag.

7. The method of claim 6, wherein the RAID data reconstruction method uses parity information and a third data object, each of which is stored on a different storage device than the first storage device.

8. The method of claim 6, further comprising updating the data duplication database each time a new data object is updated or stored on the storage system, wherein updating the data duplication database comprises:
  generating a third metadata tag corresponding with a particular pattern of bits stored in the new data object,
  associating the third metadata tag with a first data object identifier of the new data object, and
  storing the third metadata tag and the first data object identifier in a record of the data duplication database.

9. The method of claim 8, wherein the data duplication database is updated by scanning the storage system.

10. The method of claim 7, wherein the data duplication database includes records of data objects having parity information.

11. A computer-implemented method for reconstructing data stored on a failed storage device of a redundant array of independent disks (RAID) type storage system having two or more storage devices, comprising:
  generating a data duplication database storing both data object identifiers to identify data objects stored on the storage system and metadata tags corresponding with particular patterns of bits stored in the data objects, wherein the data duplication database is generated by,
    generating a first metadata tag corresponding with a particular pattern of bits stored in a first data object stored on the storage system by applying a hash function to the first data object,
    associating the first metadata tag with a first data object identifier of the first data object, and
    storing the first metadata tag and the first data object identifier in a record of the data duplication database;
  determining that a second data object stored on a first storage device requires reconstruction on a second storage device, wherein the first storage device is determined to inaccurately store at least one unit of data and the second storage device is designated to replace the first storage device;
  determining whether a third data object used to reconstruct the second data object is corrupt;
  determining, in response to determining that the third data object used to reconstruct the second data object is corrupt, whether there is a fourth data object having identical data as the third data object stored on a different storage device than the first storage device by,
    retrieving a second metadata tag corresponding to the third data object from the data duplication database,
    retrieving a third metadata tag corresponding to the fourth data object, and
    determining whether the second metadata tag is identical to the third metadata tag; and
  reconstructing, in response to determining that the second metadata tag is identical to the third metadata tag, the second data object using the fourth data object and storing the reconstructed second data object on the second storage device.

12. The method of claim 11, further comprising:
  reconstructing, in response to determining that the third data object used to reconstruct the second data object is not corrupt, the second data object according to existing RAID techniques; and
  storing the reconstructed second data object on the second storage device.

13. The method of claim 11, wherein the data duplication database is generated by scanning the storage system.

14. The method of claim 11, wherein the data duplication database includes records of data objects having parity information.

* * * * *